(12) United States Patent
Ito et al.

(10) Patent No.: US 11,031,900 B2
(45) Date of Patent: Jun. 8, 2021

(54) MOTOR DRIVE APPARATUS, REFRIGERATION CYCLE APPARATUS AND AIR CONDITIONER

(71) Applicant: Mitsubishi Electric Corporation, Tokyo (JP)

(72) Inventors: Norikazu Ito, Tokyo (JP); Shigeo Umehara, Tokyo (JP); Katsuhiko Saito, Tokyo (JP); Katsuyuki Amano, Tokyo (JP); Masahiro Fukuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 418 days.

(21) Appl. No.: 16/074,252

(22) PCT Filed: Apr. 27, 2016

(86) PCT No.: PCT/JP2016/063289
§ 371 (c)(1),
(2) Date: Jul. 31, 2018

(87) PCT Pub. No.: WO2017/187576
PCT Pub. Date: Nov. 2, 2017

(65) Prior Publication Data
US 2019/0280637 A1 Sep. 12, 2019

(51) Int. Cl.
*H02P 29/024* (2016.01)
*H02P 27/08* (2006.01)
(Continued)

(52) U.S. Cl.
CPC ............. *H02P 29/027* (2013.01); *F25B 1/00* (2013.01); *H02M 1/32* (2013.01); *H02M 1/44* (2013.01);
(Continued)

(58) Field of Classification Search
CPC ........ H02P 29/027; H02P 25/01; H02P 27/08; H02P 27/085; F25B 1/00; H02M 1/32;
(Continued)

(56) References Cited

U.S. PATENT DOCUMENTS

2003/0020342 A1\* 1/2003 Takeuchi ............... B62D 11/04
310/68 B
2015/0180397 A1 6/2015 De Sousa
(Continued)

FOREIGN PATENT DOCUMENTS

EP 1 178 596 A1 2/2002
EP 1 863 156 A1 12/2007
(Continued)

OTHER PUBLICATIONS

Extended EP Search Report ("EESR") dated Apr. 11, 2018 issued in corresponding EP patent application No. 16 854 504.2.
(Continued)

*Primary Examiner* — Zoheb S Imtiaz
(74) *Attorney, Agent, or Firm* — Posz Law Group, PLC

(57) ABSTRACT

A motor drive apparatus includes: inverter modules equivalent in number to phases of a motor; and a control unit that generates a PWM signal for driving the inverter modules by using PWM. Each of the inverter modules includes: a plurality of pairs of switching elements, each pair of switching elements including two switching elements connected in series; a drive circuit; and a protection circuit. The plurality of pairs of switching elements is connected in parallel, and power GNDs that are reference terminals of the plurality of pairs of switching elements, a control GND that is a reference terminal of the drive circuit, and a terminal for overcurrent fault input in the protection circuit are independently
(Continued)

exposed to the outside. The power GNDs and the control GND are connected to a single point on a printed circuit board by a wiring pattern.

9 Claims, 7 Drawing Sheets

(51) Int. Cl.
　　*H02M 1/32*　　(2007.01)
　　*H02M 7/00*　　(2006.01)
　　*H02M 7/5387*　　(2007.01)
　　*H02P 25/16*　　(2006.01)
　　*H02M 1/44*　　(2007.01)
　　*H02M 7/48*　　(2007.01)
　　*F25B 1/00*　　(2006.01)
　　*H02M 1/00*　　(2006.01)

(52) U.S. Cl.
　　CPC .............. *H02M 7/003* (2013.01); *H02M 7/48* (2013.01); *H02M 7/5387* (2013.01); *H02P 25/16* (2013.01); *H02P 27/08* (2013.01); *H02P 27/085* (2013.01); *H02K 2213/06* (2013.01); *H02M 2001/0009* (2013.01)

(58) Field of Classification Search
　　CPC .......... H02M 1/44; H02M 7/003; H02M 7/48; H02M 7/5387; H02M 2001/0009; H02K 2213/06
　　See application file for complete search history.

(56) References Cited

U.S. PATENT DOCUMENTS

| 2016/0265822 A1* | 9/2016 | Kamiya | ................. | H02M 1/08 |
| 2016/0380575 A1* | 12/2016 | Tsumura | ................. | H02P 29/50 |
| | | | | 318/478 |

FOREIGN PATENT DOCUMENTS

| EP | 2 224 587 A1 | 9/2010 |
| EP | 2 887 539 A2 | 6/2015 |
| JP | 64-019915 A | 1/1989 |
| JP | 2003-088098 A | 3/2003 |
| JP | 2005-278296 A | 10/2005 |
| JP | 2009-261106 A | 11/2009 |
| JP | 2013-059203 A | 3/2013 |

OTHER PUBLICATIONS

International Search Report dated Jul. 19, 2016 issued in corresponding international patent application No. PCT/JP2016/063289.
Communication pursuant to Article 94(3) EPC dated May 15, 2019 issued in corresponding EP patent application No. 16 854 6042.
Office Action dated Sep. 10, 2020 issued in corresponding EP patent application No. 16 854 604.2.

* cited by examiner

MOTOR DRIVE APPARATUS, REFRIGERATION CYCLE APPARATUS AND AIR CONDITIONER

CROSS REFERENCE TO RELATED APPLICATION

This application is a U.S. national stage application of International Patent Application No. PCT/JP2016/063289 filed on Apr. 27, 2016, the disclosure of which is incorporated herein by reference.

TECHNICAL FIELD

The present invention relates to a motor drive apparatus including switching elements, a refrigeration cycle apparatus, and an air conditioner.

BACKGROUND

With regard to a motor drive apparatus, an example of an overcurrent detecting method has been disclosed (for example, Patent Literature 1). Patent Literature 1 describes a DC current transformer that is provided in one of capacitors to enable a reduction in the wiring inductance between the capacitor and an inverter.

A power converter has also been proposed (for example, Patent Literature 2). Specifically, the power converter includes a plurality of modules connected in parallel, and each of the modules includes a plurality of circuit components of the same type having switching elements. In each of the modules, the circuit components are connected in parallel, input terminals or output terminals of the module are connected to each other, and the switching elements are driven by a common drive signal.

PATENT LITERATURE

Patent Literature 1: Japanese Patent Application Laid-Open No. H1-019915
Patent Literature 2: Japanese Patent Application Laid-Open No. 2009-261106

According to Patent Literature 1, the wiring inductance between the capacitor and the inverter can be reduced, and a surge voltage caused by the wiring inductance and di/dt of the flowing current can be suppressed. The wiring inductance between the capacitor and the inverter can be reduced if a single inverter module exists. However, in a case where a plurality of inverter modules having small capacities is connected to constitute an inverter having a large capacity, the wiring inductance is inevitably increased when the inverter modules are mounted on a printed circuit board.

In a case where a three-phase inverter having a large capacity is configured as described in Patent Literature 2, the current that flows through DC current input terminals of a single module, that is, two terminals consisting of a positive terminal and a negative terminal, is three times as large as the current that flows when a three-phase inverter includes only a single module. Therefore, the voltage that occurs in a wiring pattern also increases threefold. Furthermore, a surge voltage caused by the inductance of a lead frame between the DC current input terminals of the module and the switching elements within the module also increases threefold. This leads to such a problem that a malfunction of a peripheral circuit is likely to be caused when a plurality of inverter modules having small capacities is connected to constitute an inverter having a large capacity.

SUMMARY

The present invention has been made in consideration of the above-mentioned circumstances, and an object thereof is to obtain a motor drive apparatus capable of suppressing a malfunction of a peripheral circuit when a plurality of inverter modules having small capacities is connected to constitute an inverter having a large capacity.

In order to solve the above-mentioned problem and achieve the object, a motor drive apparatus according to the present invention includes: inverter modules equivalent in number to phases of an electric motor; and a control unit that generates a PWM signal for driving the inverter modules by using PWM. Each of the inverter modules includes: a plurality of pairs of switching elements, each pair of switching elements including two switching elements connected in series; a drive circuit that drives the plurality of pairs of switching elements in accordance with an input signal of the control unit; and a protection circuit that stops the drive circuit when a first threshold voltage value is exceeded regardless of the input signal from the control unit. The plurality of pairs of switching elements is connected in parallel, and a first terminal that is a reference terminal of the plurality of pairs of switching elements, a second terminal that is a reference terminal of the drive circuit, and an input terminal of the protection circuit are independently exposed to the outside. The first terminal and the second terminal are connected to a single point on a printed circuit board by a wiring pattern.

The present invention achieves an effect of suppressing a malfunction of a peripheral circuit when a plurality of inverter modules having small capacities is connected to constitute an inverter having a large capacity.

DETAILED DESCRIPTION

Hereinafter, a motor drive apparatus, a refrigeration cycle apparatus, and an air conditioner according to embodiments of the present invention will be described in detail based on the drawings. The present invention is not limited to the embodiments.

First Embodiment

Figure 1:
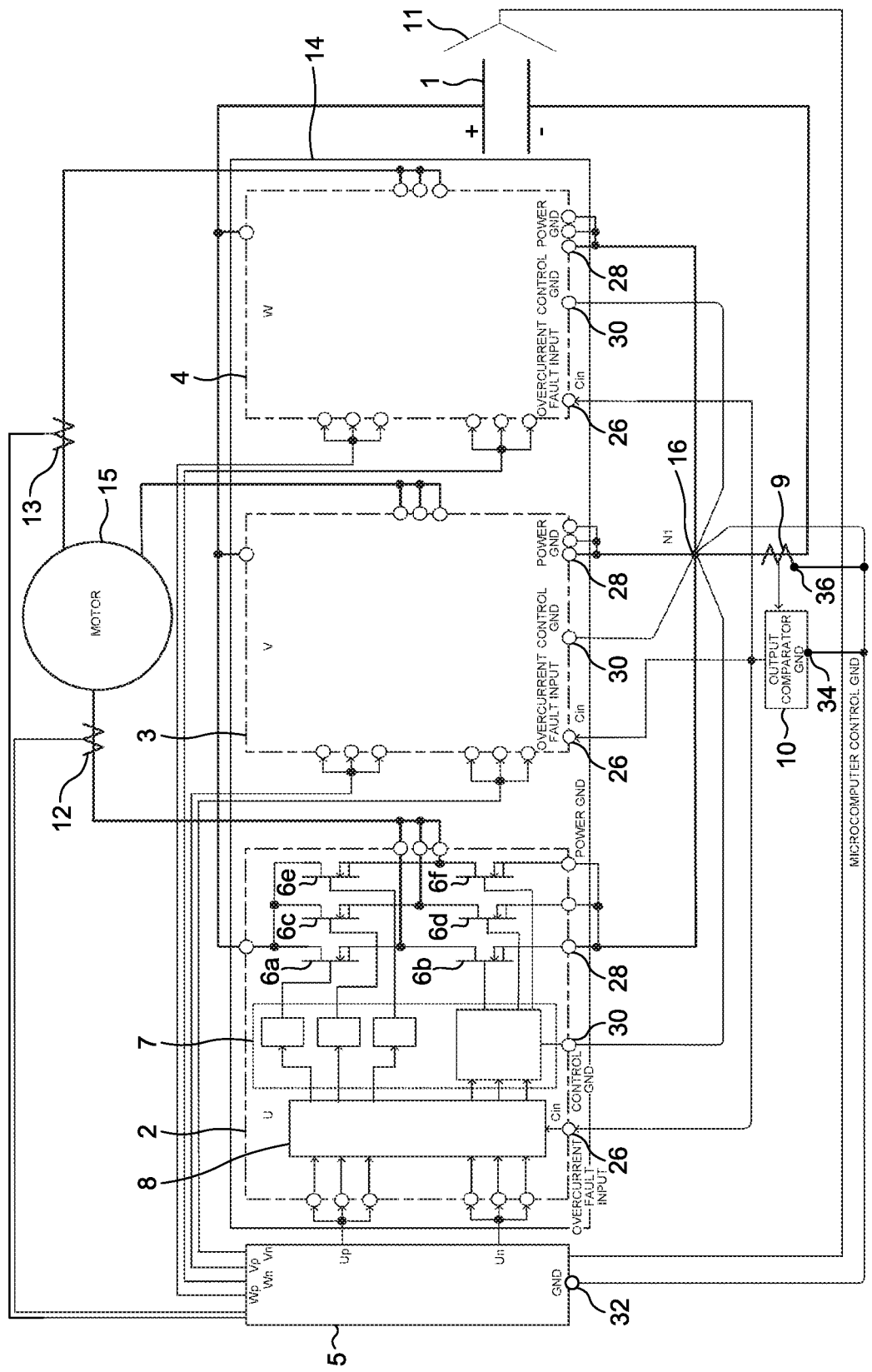
FIG. 1 is a circuit diagram illustrating an exemplary configuration of a motor drive apparatus according to a first embodiment.

FIG. 1 is a circuit diagram illustrating an exemplary configuration of a motor drive apparatus according to a first embodiment of the present invention. The motor drive apparatus according to the first embodiment includes, as illustrated in FIG. 1, a capacitor 1, a voltage detecting unit 11, an inverter unit 14, and a control unit 5. The capacitor 1 outputs a DC voltage. The voltage detecting unit 11 detects a voltage between both ends of the capacitor 1. The inverter unit 14 converts the DC current into a three-phase AC current and drives a motor 15 that is a three-phase motor. The control unit 5 generates a PWM signal for controlling the inverter unit 14. Current detectors 12 and 13 for detecting a motor current are provided between the inverter unit 14 and the motor 15.

The motor drive apparatus of the first embodiment can be used as an apparatus for driving a motor in an air conditioner, a freezer, a washer dryer, a refrigerator, a dehumidifier, a heat pump water heater, a showcase, a vacuum cleaner, a fan motor, an extractor fan, a hand dryer, an induction heating electromagnetic cooker or the like.

The inverter unit 14 includes an inverter module 2 corresponding to a U phase, an inverter module 3 corresponding to a V phase, and an inverter module 4 corresponding to a W phase. Each of the inverter modules 2, 3, and 4 includes switching elements 6a, 6b, 6c, 6d, 6e, and 6f. The switching elements 6a, 6c, and 6e constitute an upper arm, and the switching elements 6b, 6d, and 6f constitute a lower arm. In the present embodiment, even in a case where each of the switching elements 6a, 6b, 6c, 6d, 6e, and 6f has a small current capacity, the switching elements are parallelized in each phase as in FIG. 1, whereby a large current capacity can be realized. Configurations of the inverter modules 3 and 4 are similar to that of the inverter module 2.

The control unit 5 controls the inverter unit 14 based on the voltage detected by the voltage detecting unit 11 and the motor current detected by the current detectors 12 and 13. More specifically, the control unit 5 generates PWM signals Up, Vp, Wp, Un, Vn, and Wn for controlling the on/off state of the switching elements of the respective phases and the respective arms, and outputs the PWM signals Up, Vp, Wp, Un, Vn, and Wn to the inverter unit 14. The PWM signals Up, Vp, and Wp are signals for controlling the on/off state of the switching elements of the upper arms of the U phase, the V phase, and the W phase, respectively, and the PWM signals Un, Vn, and Wn are signals for controlling the on/off state of the switching elements of the lower arms of the U phase, the V phase, and the W phase, respectively. The PWM signal is a pulse-like signal that has a value of either High indicating the on state, that is, the closed state, or Low indicating the off state, that is, the open state. The width of the period for which the pulse or the on state continues is called a pulse width. Since the three switching elements constitute the same arm of the same phase, the control unit 5 determines the pulse width based on the current that flows when the three switching elements are turned on. In other words, the PWM signal is generated on the assumption that the three switching elements serve as a single switching element having a large current capacity.

Figure 2:
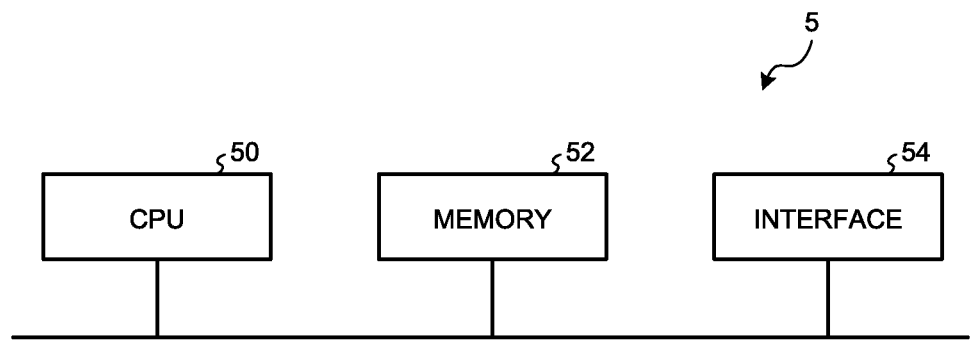
FIG. 2 is a block diagram illustrating an exemplary hardware configuration that is used when a function of a control unit according to the first embodiment is realized by software.

In a case where the function of the control unit 5 is realized by software, the control unit 5 can be configured to include a central processing unit (CPU) 50, a memory 52, and an interface 54 as illustrated in FIG. 2. The CPU 50 performs a computation. Programs that are read by the CPU 50 are saved in the memory 52. Signals are input and output through the interface 54. The CPU 50 may be what is called a computing device, a microprocessor, a microcomputer, a processor, a digital signal processor (DSP) or the like. Examples of the memory 52 include a non-volatile or volatile semiconductor memory, a magnetic disk, a flexible disk, an optical disc, a compact disc, a mini disc, a digital versatile disc (DVD), and a Blu-ray (BD, registered trademark) disc or the like. Examples of the non-volatile or volatile semiconductor memory include a random access memory (RAM), a read only memory (ROM), a flash memory, an erasable programmable ROM (EPROM), and an electrically EPROM (EEPROM) or the like.

The programs for executing the function of the control unit 5 are stored in the memory 52. The CPU 50 executes the computation and the control that are required for the generation of the PWM signals based on the detection value of the voltage detecting unit 11, the detection value of the current detectors 12 and 13, and various types of information received through the interface 54.

Based on the PWM signals generated by the control unit 5, a drive circuit 7 generates, in each phase, namely, in each of the inverter modules 2, 3, and 4, PWM signals for driving the switching elements 6a, 6b, 6c, 6d, 6e, and 6f by using the PWM. More specifically, the drive circuit 7 makes three copies of each of Up and Un and outputs the copied signals to the inverter module 2 corresponding to the U phase. The drive circuit 7 makes three copies of each of Vp and Vn and outputs the copied signals to the inverter module 3 corresponding to the V phase. The drive circuit 7 makes three copies of each of Wp and Wn and outputs the copied signals to the inverter module 4 corresponding to the W phase.

A protection circuit 8 transmits, to the drive circuit 7 in each phase, namely, in each of the inverter modules 2, 3, and 4, the PWM signals for driving the switching elements 6a, 6b, 6c, 6d, 6e, and 6f by using the PWM based on the PWM signals generated by the control unit 5. The protection circuit 8 also includes a terminal 26 for overcurrent fault input (denoted by "Cin" in FIG. 1), so that a voltage value indicating the overcurrent fault input can be input from the outside of the inverter modules 2, 3, and 4. Therefore, the transmission of the PWM signals from the control unit 5 to the drive circuits 7 stops when the voltage of the terminal 26 exceeds a preset threshold value. In the present embodiment, a value of 0.5 V+5%, that is, 0.525 V (=0.5 V+0.025 V) is used an example of the voltage value indicating the overcurrent fault input.

A current detector 9 is arranged between an earth point 16 (also denoted by "N1" in FIG. 1) to be described later and a negative terminal of the capacitor 1. The earth point 16 is a meeting point of wiring patterns extending from three power GNDs 28 provided on the negative side, that is, the source side, of the switching elements 6b, 6d, and 6f of each of the inverter modules 2, 3, and 4. The power GND 28 is a reference terminal that gives a reference potential to a pair of switching elements. The power GND 28 is referred to as a first terminal for the sake of convenience when it is identified without the reference sign.

The current detector 9 detects a total value of currents that return to the negative terminal of the capacitor 1, that is, currents that flow through the inverter modules 2, 3, and 4, and transmits a detected voltage signal to a comparator 10. A shunt resistor may be inserted to constitute the current detector 9, or a current sensor that uses a magnetic body core may be used as the current detector 9. Alternatively, a coreless sensor including an MI current sensor that utilizes the magnetoimpedance effect, an MR current sensor that utilizes the magnetoresistance effect, or a current sensor that utilizes the Hall effect may be used as the current detector 9. However, the coreless sensor is better than the core sensor. With the use of the coreless sensor, the impedance that occurs from a positive terminal of the capacitor 1 to the current detector 9 through the inverter modules 2, 3, and 4 can be reduced. Consequently, a surge voltage due to the current that flows through these components can be suppressed. As a result, voltage stress that is applied to the switching elements within the inverter modules can be suppressed, and the reliability of the apparatus can be improved.

In the configuration of FIG. 1, the current detector 9 is connected between the earth point 16 that is the junction of the power GNDs 28 of the inverter modules 2, 3, and 4 and the capacitor 1. Alternatively, the current detector 9 may be connected between the positive terminal of the capacitor 1 and a junction on the positive side, that is, the drain side, of the switching elements of the upper arms of the inverter modules 2, 3, and 4. In this configuration, an earth fault current can be detected when the motor 15 is subjected to an earth fault.

The comparator 10 operates as an overcurrent detecting circuit. The comparator 10 compares a preset first voltage value and the voltage signal output from the current detector 9, and outputs a High signal when the output voltage signal of the current detector 9 exceeds the preset first voltage value, that is, when the total value of the currents that flow through the inverter modules 2, 3, and 4 is greater than a preset current value. Since the preset first voltage value as used herein is a voltage that is equal to or greater than the threshold value of the overcurrent fault input in the protection circuit 8, 0.525 V mentioned above is used as an example of the preset first voltage value. Note that 0.525 V is only an example, and the preset first voltage value is not limited to this value.

When a load short occurs, and both the upper arm and the lower arm of the switching elements are simultaneously turned on through the inductance of the motor 15, a current that exceeds an allowable current of the motor 15 flows. When the current that exceeds the allowable current flows, the switching elements of the inverter modules 2, 3, and 4 may be damaged, or demagnetization of the motor 15 may be caused. The demagnetization of the motor 15 as used herein refers to such a phenomenon that, for example, magnetic force of a magnet in a rotor is reduced in a case where the motor 15 is a DC brushless motor. Therefore, in a case where the motor 15 is a DC brushless motor, a protection current value is determined with a margin in consideration of the demagnetization of the motor 15.

When an arm short occurs where both the upper arm and the lower arm of the switching elements connected in series are simultaneously turned on, an arm short current flows through the inverter modules 2, 3, and 4. When the arm short current that flows through the inverter modules 2, 3, and 4 exceeds the allowable current, the switching elements of the inverter modules 2, 3, and 4 may be damaged. Therefore, a delay time for an overcurrent breaking circuit is determined so that the inverter modules 2, 3, and 4 are stopped within an allowable time when the arm short current flows through the inverter modules 2, 3, and 4. However, if the delay time is determined too short, a detection error may occur as described later when the arm short current does not flow. Therefore, the delay time is determined within the allowable time so that the detection error does not occur.

In order to avoid the damage to the switching elements and the demagnetization of the motor 15, the comparator 10 outputs, to the protection circuit 8, the voltage that is equal to or greater than the threshold value of the overcurrent fault input in the protection circuit 8 when the detection value of the current detector 9 exceeds the first voltage value, so as to cause the protection circuit 8 to operate. The protection circuit 8 stops the output of the PWM signals and stops the output of the inverter modules 2, 3, and 4 in response to detecting an excess of the overcurrent fault input over the threshold value.

Next, materials for the switching elements provided in the inverter modules 2, 3, and 4 will be described. An element made of any material can be used as the switching element. For example, a wide-bandgap semiconductor such as gallium nitride (GaN), silicon carbide (SiC), and diamond can be used. The use of the wide-bandgap semiconductor raises a withstand voltage property and allowable current density, whereby the module can be reduced in size. A heat dissipation fin of a heat dissipation unit can also be reduced in size since the wide-bandgap semiconductor has a high heat resistance property. Only a small loss occurs at the time of the switching owing to a high switching speed, which can also contribute to a reduction in size of the heat dissipation fin of the heat dissipation unit.

Figure 3:
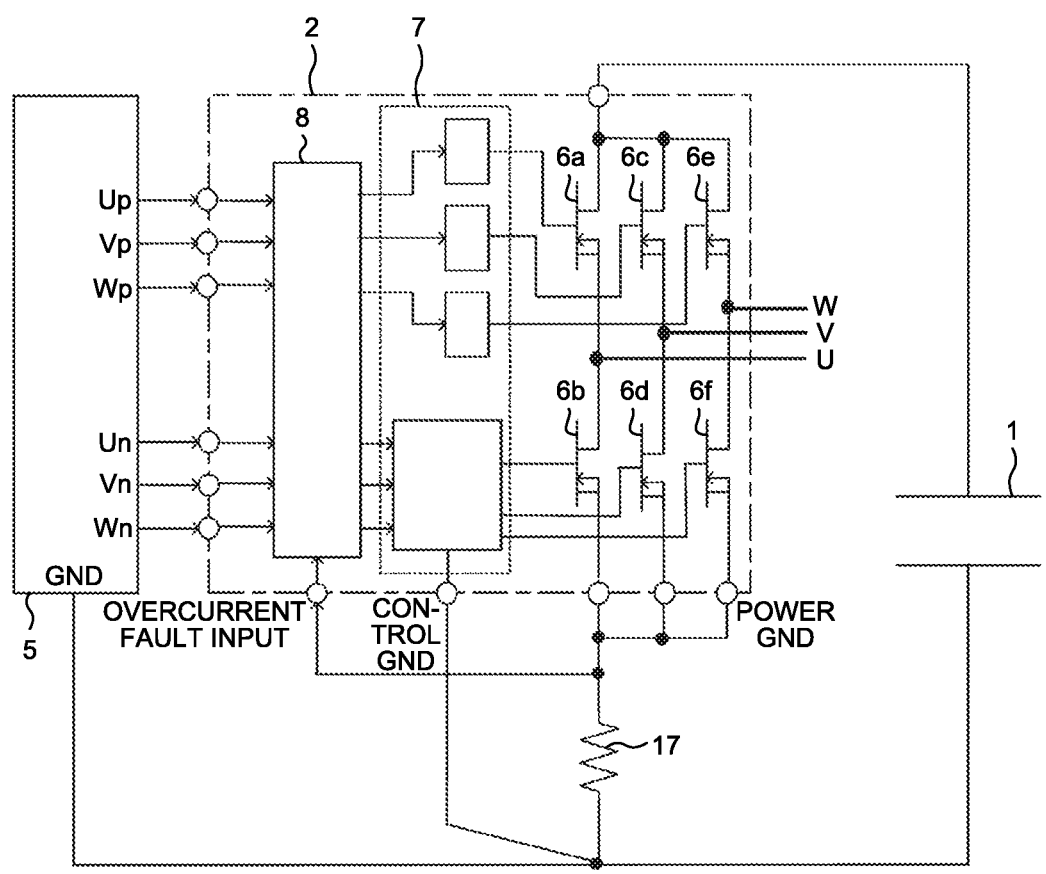
FIG. 3 is a circuit diagram illustrating a configuration of a general inverter as a comparative example.

Next, characteristics of the inverter according to the present embodiment will be described in comparison with a general inverter that drives the same three-phase motor. FIG. 3 is a circuit diagram illustrating a configuration of the general inverter as a comparative example. Components which are the same as or equivalent to those in FIG. 1 are denoted by the same reference signs, and overlapping descriptions are omitted.

In the general inverter, an inverter module 2 includes three pairs of switching elements, i.e. switching elements 6a and 6b, switching elements 6c and 6d, and switching elements 6e and 6f, as illustrated in FIG. 3. Hereinafter, in distinction from the inverter unit 14 of the present embodiment, an inverter that uses a single pair of switching elements per phase as in the comparative example is called a single pair inverter, and in a case where pairs of switching elements for the three phases, namely, three pairs of switching elements, are mounted as a single module as in the comparative example, this module is called a single inverter module. In the single pair inverter, as illustrated in FIG. 3, the single switching element is provided on the upper arm of the same phase, and the single switching element is provided on the lower arm of the same phase. To the contrary, in the inverter of the present embodiment, the three switching elements are provided on the upper arm of the same phase, and the three switching elements are provided on the lower arm of the same phase. Therefore, assuming that the current capacity of the mounted switching element is Am, the current capacity of the inverter module in which the three switching elements are connected in parallel is ideally 3×Am.

Generally, when the three-phase motor is driven with the use of the inverter, the inverter includes, in each phase, a pair of switching elements having a single switching element on the upper arm and a single switching element on the lower arm connected in series. Therefore, as illustrated in the comparative example, the general inverter includes, in total for the three phases, 2×3 switching elements, that is, six switching elements. In a case where the switching elements are mounted as a chip, the yield drops if the chip area is increased. On the other hand, the yield of the chips taken from a wafer can be improved if the chip area is decreased. Especially when SiC is used as the switching element, the chip area is desirably decreased for a cost reduction since the wafer is expensive. In a case where a small current capacity is acceptable, such as when the inverter is used for a household air conditioner, the cost reduction can be realized with the use of the inverter module that controls the three phases by means of the six switching elements having a small chip area.

However, the current capacity is reduced when the chip area is decreased. Therefore, it is difficult for the inverter module of the comparative example, namely, the inverter module that drives the three-phase motor by means of the six switching elements, to achieve both the cost reduction and the current increase. To the contrary, in the present embodiment, both the cost reduction and the current increase can be achieved by using the switching elements having small current capacities in parallel.

In addition, as illustrated in FIG. 3, a basic part of the inverter module can be common to the single inverter module for the three phases including the six switching elements illustrated in the comparative example and each of the inverter modules 2, 3, and 4 including the six switching elements according to the present embodiment. Therefore, the single inverter module for the three phases including the six switching elements can be used as each of the inverter modules 2, 3, and 4 as it is or with only minor changes. In other words, the single inverter module for the three phases and the inverter modules 2, 3, and 4 illustrated in FIG. 1 can be manufactured as the same or similar modules. Thus, the inverter modules 2, 3, and 4 for the large current capacity can be manufactured at a low cost. For example, the single module for the three phases including the six switching elements can be used for a household air conditioner, and the inverter unit 14 including the three modules as illustrated in FIG. 1 can be used for a professional-use air conditioner.

Next, terminals that give respective reference potentials to the inverter modules 2, 3, and 4, the control unit 5, and the comparator 10 and a method of connecting the terminals will be described. As illustrated in FIG. 1, The respective power GNDs 28 are the reference terminals that give the reference potentials to the pairs of switching elements of the inverter modules 2, 3, and 4, and electrically connected to the earth point 16 that is a single earth point. As mentioned above, the earth point 16 is electrically connected to the negative terminal of the capacitor 1. The current detector 9 is arranged between the earth point 16 and the negative terminal of the capacitor 1.

A control GND 30 that is a reference terminal of the drive circuit 7 in each of the inverter modules 2, 3, and 4 and a GND 32 that is a reference terminal of the control unit 5 are connected to the single earth point 16. A reference terminal 36 of the current detector 9 and a GND 34 that is a reference terminal of the comparator 10 are connected to a microcomputer control GND extending from the GND 32 that is the reference terminal of the control unit 5. The reference terminal 36 of the current detector 9 and the GND 34 that is the reference terminal of the comparator 10 may also be connected to the earth point 16. The control GND 30 that is the reference terminal of the drive circuit 7, the GND 32 that is the reference terminal of the control unit 5, the reference terminal 36 of the current detector 9, and the GND 34 that is the reference terminal of the comparator 10 are respectively referred to as a second terminal, a third terminal, a fourth terminal, and a fifth terminal for the sake of convenience when they are identified without the reference signs.

Figure 4:
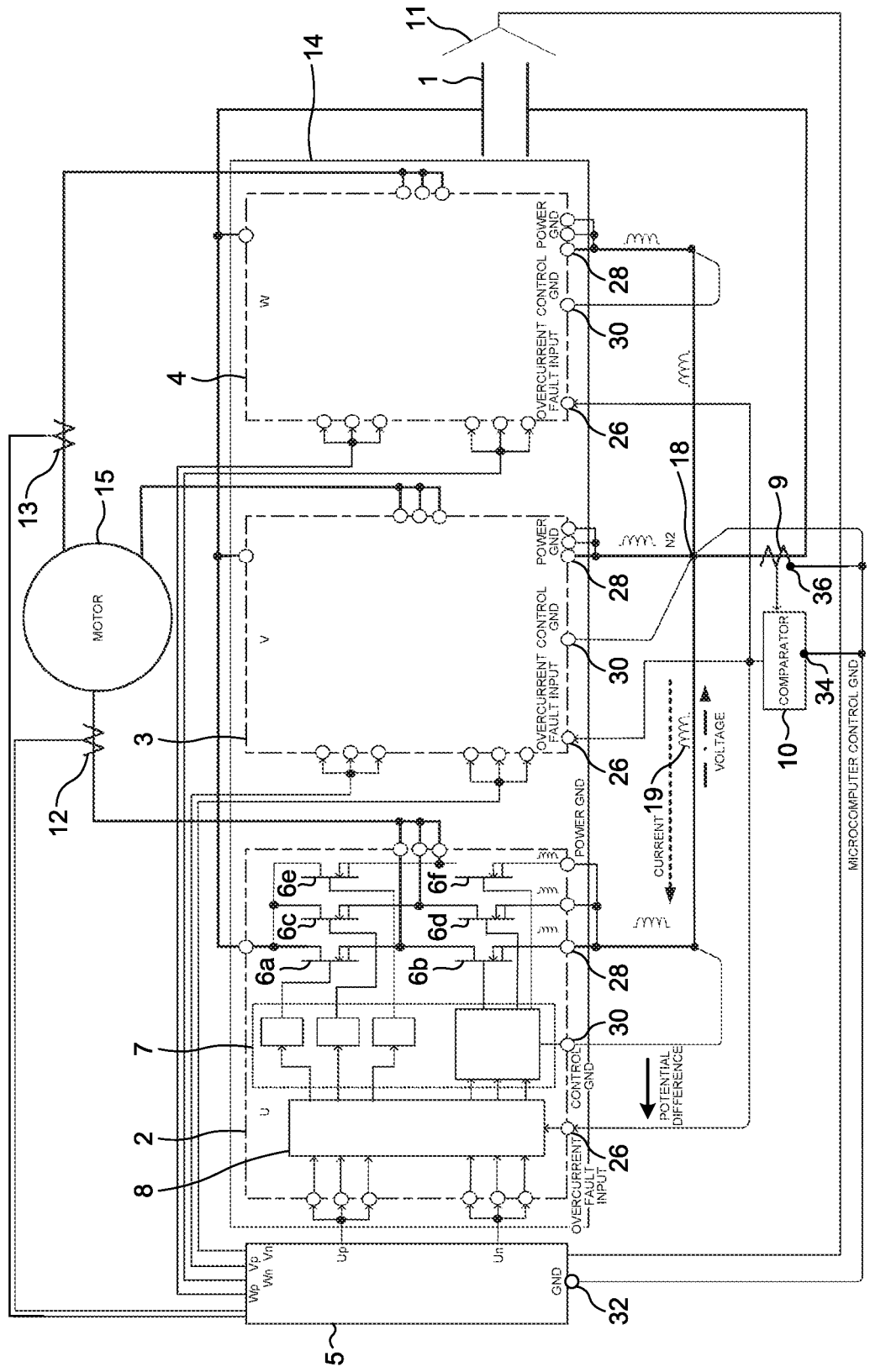
FIG. 4 is a circuit diagram illustrating a connection state that is obtained when three inverter modules are connected under a concept of a single pair inverter illustrated in FIG. 3.
Figure 5:
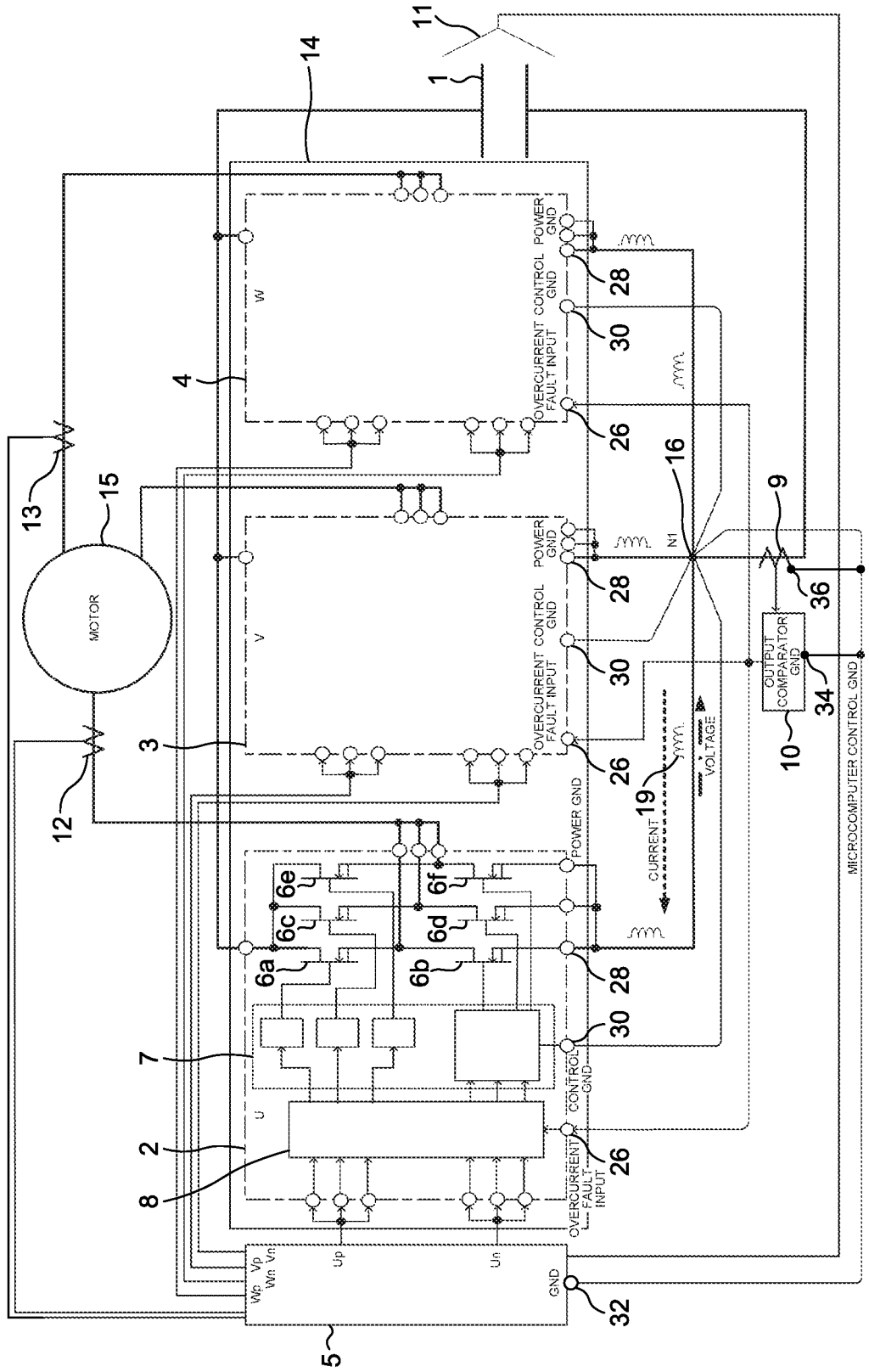
FIG. 5 is a circuit diagram illustrating a connection state that is obtained as the result of the connection under a concept of the first embodiment.

Hereinafter, reasons for the single point connection at the earth point 16 will be described with reference to the drawings in FIGS. 1 to 5. FIG. 4 is a circuit diagram illustrating a connection state that is obtained when the three inverter modules are arranged to be aligned and connected under the concept of the single pair inverter illustrated in FIG. 3. In FIG. 4, an example in which the three single pair inverters of FIG. 2 are simply aligned and connected by a simple wiring pattern is illustrated. FIG. 5 is a circuit diagram illustrating a connection state that is obtained when the three inverter modules are arranged to be aligned and connected under the concept according to the present embodiment. Although the current detector is illustrated by a shunt resistor 17 in FIG. 3, the current detector in FIG. 4 is changed from the shunt resistor 17 to the insulation type current detector 9 that is adaptable to the large current application in order to deal with the large current.

First of all, the single pair inverter having a small capacity only requires the single inverter module 2 as illustrated in FIG. 3, and can have a short wiring pattern. Since the flowing current is also small, the following problem is less likely to occur even when the wide-bandgap semiconductor that exhibits a high switching speed is used. The problem in this context is a problem that occurs when an inverter having a large capacity is configured with the use of single pair inverters having small capacities. Hereinafter, the problem will be described in detail.

First, when the inverter modules 2, 3, and 4 are simply connected for increasing the capacity of the inverter unit 14, the length of the wiring pattern is increased. Due to the long wiring pattern, the inductance beyond the assumption exists between the power GND 28 of each of the inverter modules 2, 3, and 4 and the negative terminal of the capacitor 1.

The inductance also exists in a lead frame within the inverter module. The conventional specification supposes an inverter having a small capacity. Therefore, when the three inverter modules are used, the current that flows to the inductance of the lead frame increases threefold. Furthermore, in a case where the wide-bandgap semiconductor is employed, a potential difference that occurs between the inductance of the wiring pattern and the inductance of the lead frame is increased due to the high switching speed.

For example, the switching element formed of the wide-bandgap semiconductor is known to exhibit a current change speed (di/dt) of, for example, 400 A/us to 1000 A/us when the switching element is turned on or turned off. This value is about five to twenty times as large as that of an IGBT formed of a conventional silicon (Si) semiconductor. Therefore, when the plurality of inverter modules having small capacities constitutes the inverter having a large capacity, the influence of the inductances of the wiring pattern and the lead frame is increased. Recently, another type of switching element formed of a silicon (Si) semiconductor has been known to exhibit a current change speed (di/dt) of 200 A/us or more when the switching element is turned on or turned off. The following method according to the present embodiment is suitable for this type of switching element as well.

Returning to FIG. 4, a current that flows from the negative side of the capacitor 1 to the inverter module 2 in a direction illustrated by a broken arrow is considered. An inductance 19 caused by a U-phase GND wiring pattern exists between a connection point 18 (also denoted by "N2" in FIG. 4) and the control GND 30 of the inverter module 2. From the inductance 19 and di/dt that is a time change component of a current that flows through the inductance 19, a voltage induced in the opposite direction of the current is generated. Meanwhile, a reference potential of the current detector 9 and a reference potential of the comparator 10 that detects the overcurrent are based on the connection point 18. Therefore, even when the comparator 10 outputs Low, a potential difference caused by the inductance 19 occurs between the terminal 26 for the overcurrent fault input in the protection circuit 8 of the inverter module 2 and the control GND 30. As mentioned above, since the voltage value that is applied to the terminal 26 to indicate the overcurrent fault input is small, i.e. about 0.5 V, the output of the inverter sometimes stops even though the overcurrent does not flow at the timing when the elements of the upper arm are turned off. Such a phenomenon is referred to as "early out". In a case where the inverter modules 2, 3, and 4 are connected in parallel and operated, the phenomenon of the "early out" inevitably occurs since the long GND wiring pattern is required. Especially when the switching elements formed of the wide-bandgap semiconductors are used, the induced voltage is increased, and the phenomenon of the "early out" notably occurs.

On the other hand, in the present embodiment, the power GNDs 28 of the inverter modules 2, 3, and 4 and the control GNDs 30 of the drive circuits 7 of the inverter modules 2, 3, and 4 are connected to the single earth point 16 as illustrated in FIG. 1. Therefore, the voltage induced by the inductance 19 of the wiring pattern and di/dt is less likely to occur between the control GND 30 of each of the inverter modules 2, 3, and 4 and the terminal 26 of the protection circuit 8 of each of the inverter modules 2, 3, and 4, whereby the occurrence of the "early out" can be suppressed.

For example, in FIG. 5, when a U-phase current is about to flow in a direction of an illustrated broken arrow, the inductance 19 caused by the U-phase GND wiring pattern exists between the earth point 16 and the power GND 28 of the inverter module 2. From the inductance 19 and di/dt that is the time change component of the current that flows through the inductance 19, the voltage induced in the opposite direction of the current is generated. However, since the control GND 30 of the inverter module 2 is connected to the earth point 16, a potential difference caused by the wiring pattern is less likely to occur between the terminal 26 for the overcurrent fault input in the protection circuit 8 of the inverter module 2 and the control GND 30 of the drive circuit 7, and the occurrence of the "early out" can be suppressed.

Figure 6:
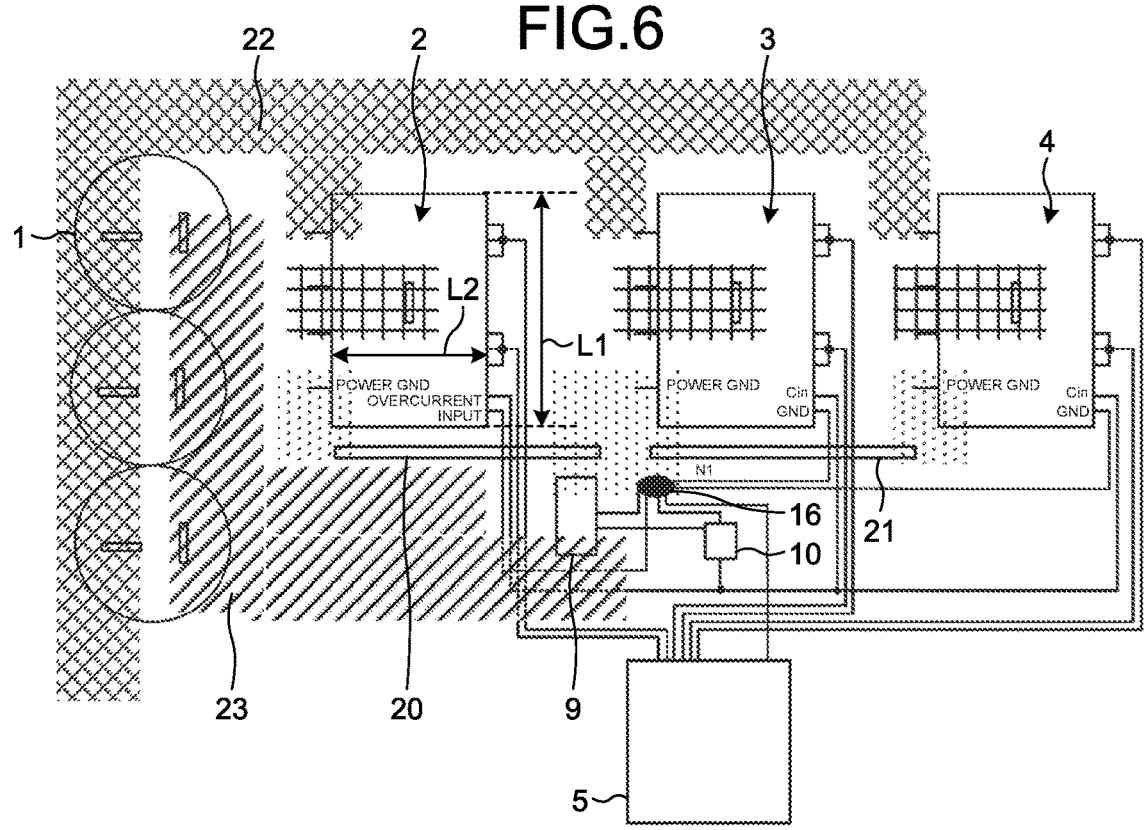
FIG. 6 is a diagram illustrating an exemplary wiring pattern of the motor drive apparatus according to the first embodiment.

Next, the wiring pattern of the motor drive apparatus according to the present embodiment will be described. FIG. 6 is a diagram illustrating an exemplary wiring pattern of the motor drive apparatus according to the present embodiment. In FIG. 6, the inverter modules 2, 3, and 4 are oriented in the same direction and arranged such that a direction orthogonal to a longitudinal direction of a housing coincides with an array direction of the modules. Although the inverter modules 2, 3, and 4 are structured as a dual inline package (DIP) in FIG. 6, the inverter modules 2, 3, and 4 may be configured as a single inline package (SIP). However, since the DIP enables a configuration with a long distance between a terminal having a smaller withstand voltage (approximately 25 V or less) and a terminal having a greater withstand voltage (several hundred volts), the insulation distance is easily secured on a printed circuit board, and the safety design can be produced.

In FIG. 6, the capacitor 1, the inverter modules 2, 3, and 4, the control unit 5, the current detector 9, the comparator 10, and the earth point 16 are illustrated. Jumper lines 20 and 21 for crossing signal wiring patterns, a wiring pattern 22 for a positive line of the DC voltage, and a wiring pattern 23 for a negative line of the DC voltage are also illustrated in FIG. 6. The power GNDs increase in length when the plurality of inverter modules 2, 3, and 4 is connected. In this regard, in FIG. 6, the earth point 16 (N1) is provided near (immediately near) the power GND of the inverter module 3 arranged in the center of the inverter modules 2, 3, and 4. The power GNDs 28 of the inverter modules 2, 3, and 4, the control GNDs 30 of the drive circuits 7 of the inverter modules 2, 3, and 4, the GND 32 of the control unit 5, the reference terminal 36 of the current detector 9, and the GND 34 of the comparator 10 are connected to the single earth point 16.

In FIG. 6, the jumper lines 20 and 21 extend along the array direction of the inverter modules 2, 3, and 4. As for the housing of each of the inverter modules 2, 3, and 4, the length in the longitudinal direction, that is, the length of the long side, is denoted by L1, and the length in the direction orthogonal to the longitudinal direction, that is, the length of the short side, is denoted by L2. In this case, the length of each of the jumper lines 20 and 21 is preferably equal to or less than the sum of the length of the long side and the length of the short side of the housing, that is, L1+L2. The distance between each of the jumper lines 20 and 21 and the housing is preferably less than the length L2 of the short side of the housing. Furthermore, the distance between the earth point 16 and the housing is preferably equal to or less than the length L2 of the short side of the housing. The inductance of the wiring pattern can be decreased when these conditions are satisfied.

Figure 7:
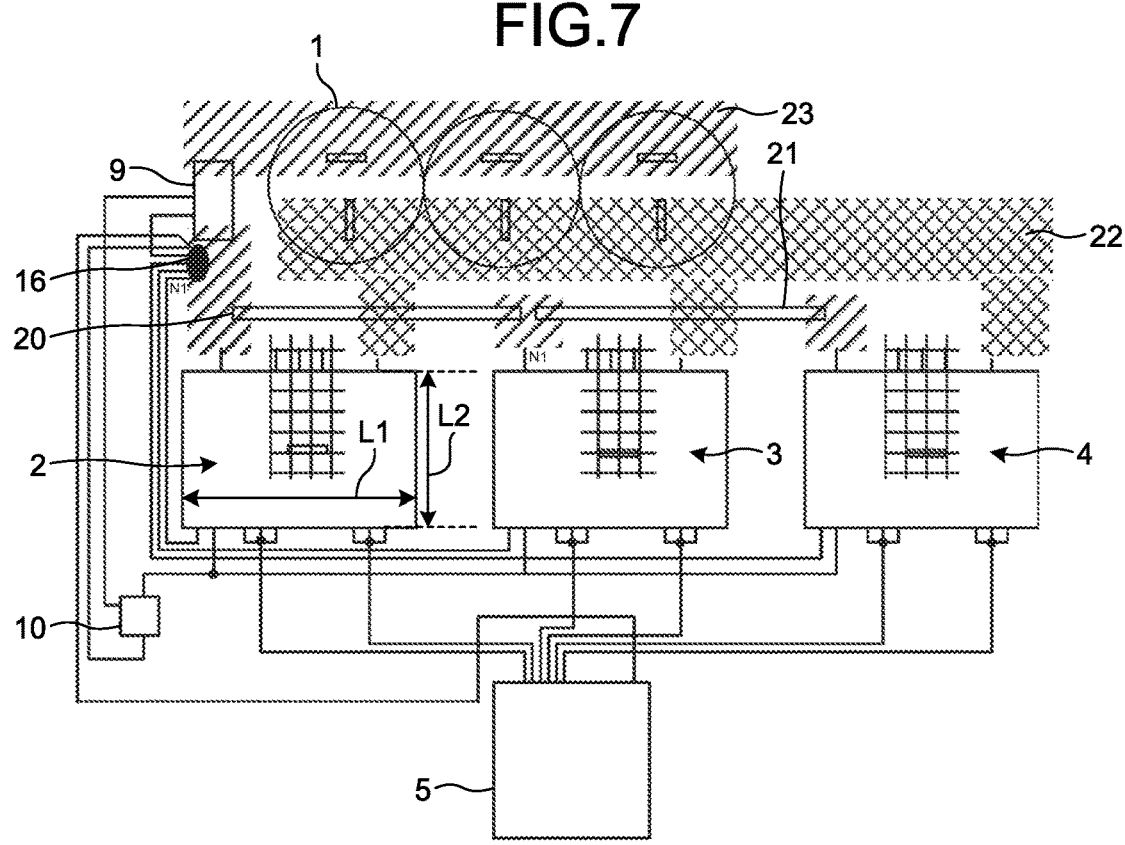
FIG. 7 is a diagram illustrating another exemplary wiring pattern of the motor drive apparatus according to the first embodiment.

Alternatively, the orientation of the arrangement of the inverter modules 2, 3, and 4 may be changed as in FIG. 7. In FIG. 7, the inverter modules 2, 3, and 4 are oriented in the same direction and arranged such that the longitudinal direction of the housing coincides with the array direction of the modules. In this case, the wiring pattern through which a large current flows can be shortened. Since the high-voltage wiring pattern and the low-voltage wiring pattern are partitioned, the insulation distance is easily secured, and high-density mounting is enabled, whereby a substrate can be reduced in size.

As mentioned above, the motor drive apparatus of the present embodiment is configured to include, in each phase, the inverter module in which the plurality of pairs of switching elements is connected in parallel, and each pair of switching elements includes the single switching element in each of the upper and lower arms. Therefore, the current increase can be realized while the cost is suppressed. In addition, the first terminal that gives the reference potential to the pairs of switching elements of each inverter module and the second terminal that is the reference terminal of the drive circuit of each inverter module are connected to the common single earth point. Therefore, the voltage induced by the inductance of the wiring pattern and di/dt is less likely to occur between the second terminal of each inverter module and the protection circuit that protects each inverter module, whereby the occurrence of the "early out" can be suppressed. The third terminal that is the reference terminal of the control unit, the fourth terminal that is the reference terminal of the current detector, and the fifth terminal that is the reference terminal of the overcurrent detecting circuit may also be connected to the common single earth point.

The exemplary configuration of FIG. 1 describes an example of using a single inverter module per phase. Alternatively, a plurality of inverter modules per phase may be provided. For example, two inverter modules per phase may be used and connected in parallel, and the number of phases×2 inverter modules may be used. FIG. 1 is an example of supplying DC power from the capacitor 1. However, the present invention is not limited to the exemplary configuration of FIG. 1 as long as the DC current is input to the inverter modules 2, 3, and 4. The DC current may be input to the inverter modules 2, 3, and 4 from DC power generated by a rectifier that rectifies an AC current from AC power.

The exemplary configuration of FIG. 1 also describes an example of applying the voltage value of the overcurrent fault input to each of the input terminals of the protection circuits of the inverter modules based on the detection value of the DC current that flows through the input side of the inverter modules. However, similar control may be performed based on a detection value of an AC current that flows through the output side of the inverter modules. The detection value of the current detectors 12 and 13 can be utilized in this type of control.

Second Embodiment

Next, a motor drive apparatus according to a second embodiment will be described. An example of the single point connection has been described in the first embodiment. In the present embodiment, an example of adjusting the wiring inductances of the respective inverter modules will be described.

Figure 8:
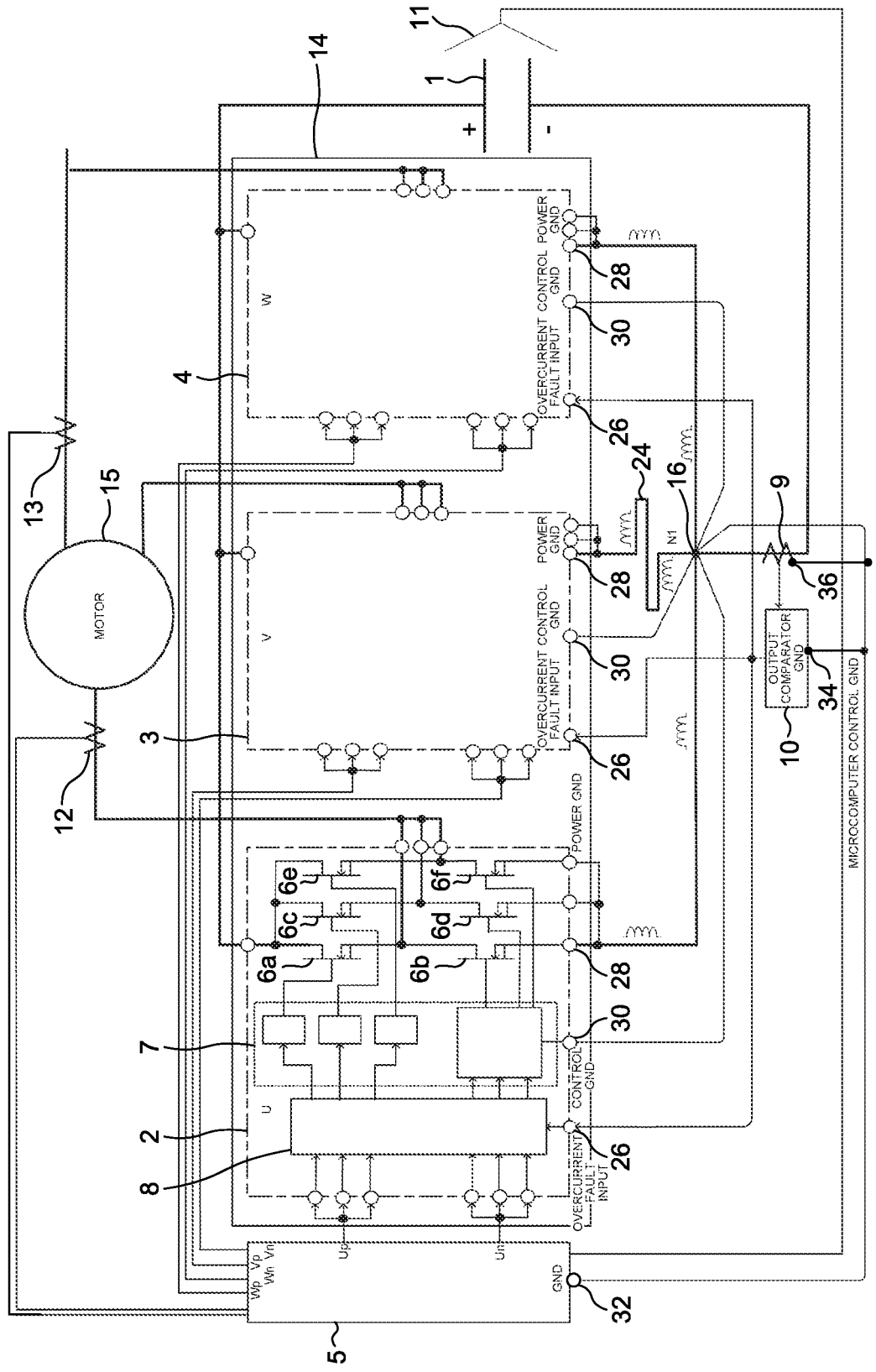
FIG. 8 is a circuit diagram illustrating an exemplary configuration of a motor drive apparatus according to a second embodiment.

FIG. 8 is a circuit diagram illustrating an exemplary configuration of the motor drive apparatus according to the second embodiment. As illustrated in FIG. 8, in the second embodiment, an additional wiring pattern 24 is illustrated between the power GNDs 28 of the inverter module of the V phase, namely, the inverter module 3, and the earth point 16. The wiring pattern 24 is provided for the adjustment of the impedance. Components which are the same as or equivalent to those in FIG. 1 are denoted by the same reference signs, and overlapping descriptions are omitted.

Figure 9:
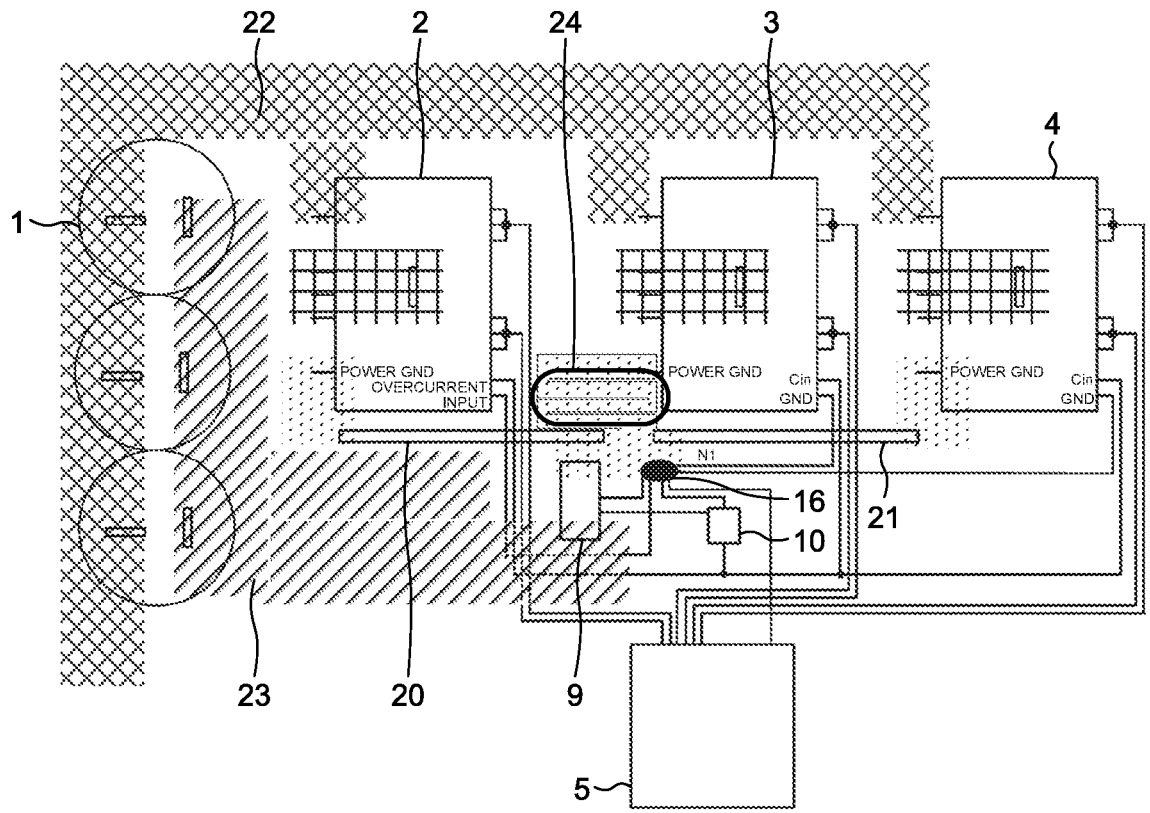
FIG. 9 is a diagram illustrating an exemplary wiring pattern of the motor drive apparatus according to the second embodiment.

FIG. 9 is a diagram illustrating an exemplary wiring pattern of the motor drive apparatus illustrated in FIG. 8. In FIG. 9, as surrounded by an oval line, the wiring pattern 24 is provided so that an equivalent inductance component appears at the wiring part leading to the power GNDs of the inverter module 3. Components which are the same as or equivalent to those in FIG. 6 are denoted by the same reference signs, and overlapping descriptions are omitted.

In the first embodiment, the length of the wiring pattern leading to the power GNDs of each of the inverter modules 2, 3, and 4, that is, the wiring impedance, is not managed. Therefore, while the distance between the power GNDs of the inverter module 3 and the current detector 9 is the shortest, the distances between the power GNDs of the inverter modules 2 and 4 and the current detector 9 are equivalent in length. Thus, the inductance of the wiring pattern that occurs for the inverter module 3 and the voltage induced by di/dt are different from the inductances of the wiring patterns that occur for the inverter modules 2 and 4 and the voltages induced by di/dt, respectively. Consequently, noise voltages that occur between the overcurrent fault input terminals and the control GND terminals of the inverter modules 2 and 4 are different from a noise voltage that occurs between the overcurrent fault input terminal and the control GND terminal of the inverter module 3, which causes variations in the overcurrent breaking values for the respective protection circuits 8 of the inverter modules 2, 3, and 4, that is, the overcurrent breaking values for the respective phases (U phase, V phase, and W phase). In the configuration of the first embodiment, although the influence of the voltage induced by the inductance of the wiring pattern and di/dt can be suppressed, the voltage itself induced by the inductance of the wiring pattern and di/dt is varied.

On the other hand, in the present embodiment, the shortest wiring pattern of the V phase is adjusted to coincide with the wiring patterns of the other phases (U phase and W phase), whereby the distances between the power GNDs of the inverter modules 2, 3, and 4 and the current detector 9 are electrically equivalent in length. Therefore, the impedances between the power GNDs of the inverter modules 2, 3, and 4 and the current detector 9 are equal to one another, and the difference in the voltage induced by the inductance of the wiring pattern and di/dt is reduced. Consequently, variations in the overcurrent breaking values for the respective phases (U phase, V phase, and W phase) can be suppressed.

In the above description, the impedances between the power GNDs of the inverter modules 2, 3, and 4 and the current detector 9 are equal to one another. However, the impedances of the three do not need to exactly coincide with one another, and an error is allowed. Assuming that a target value for the adjustment of the impedance is Z0, the impedances of the three only need to be preferably within the range of ±5%, and more preferably within the range of ±2.5%. The impedances of the three can be regarded as the same when the impedances are within such a range.

As mentioned above, the second embodiment can suppress variations in the overcurrent breaking which result from the noise components arising from the induced voltages caused by the inductances of the wiring patterns and di/dt. The second embodiment can also suppress variations in the overcurrent breaking operation in combination with the configuration of the first embodiment.

Third Embodiment

Figure 10:
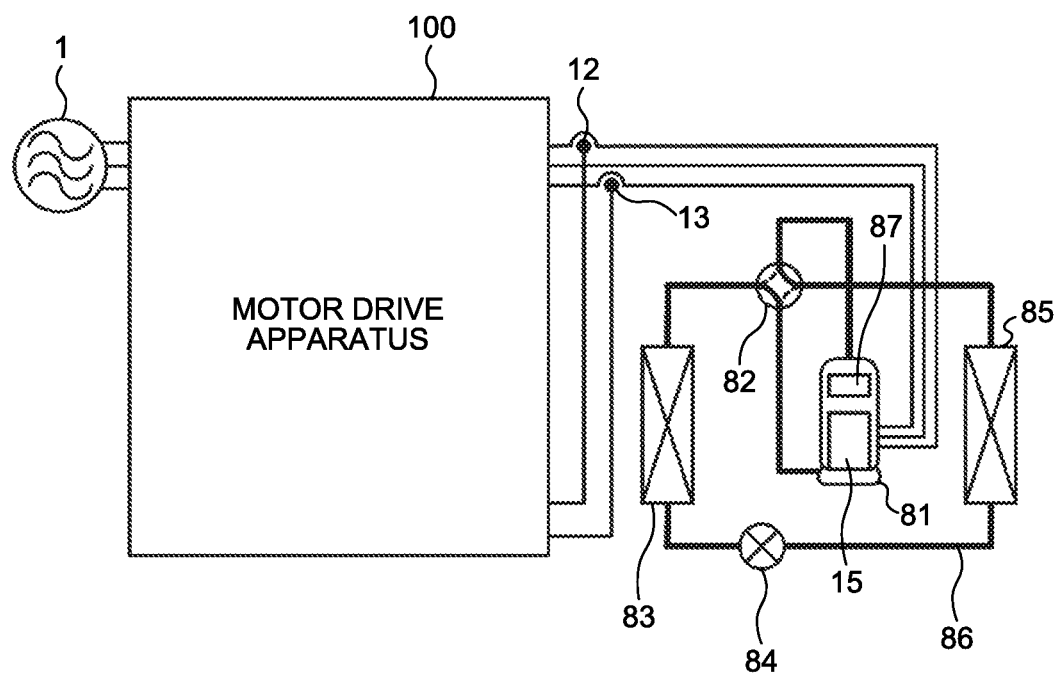
FIG. 10 is a diagram illustrating an exemplary configuration of an air conditioner according to a third embodiment.

FIG. 10 is a diagram illustrating an exemplary configuration of an air conditioner according to a third embodiment. The air conditioner of the present embodiment includes the motor drive apparatus mentioned in the first embodiment and the second embodiment as a motor drive apparatus 100. The air conditioner of the present embodiment has a refrigeration cycle in which a compressor 81, a four-way valve 82, an outdoor heat exchanger 83, an expansion valve 84, and an indoor heat exchanger 85 are attached via a refrigerant pipe 86, and constitutes a separate type air conditioner. The motor 15 of the first embodiment is embedded in the compressor 81.

A compression mechanism 87 that compresses a refrigerant and the motor 15 that drives the compression mechanism 87 are provided inside the compressor 81. The refrigerant circulates between the outdoor heat exchanger 83 and the indoor heat exchanger 85 from the compressor 81, whereby the refrigeration cycle for cooling and heating or the like is configured. The configuration illustrated in FIG. 10 can be applied to not only the air conditioner but also an instrument including the refrigeration cycle such as a refrigerator and a freezer.

Since the air conditioner of the present embodiment includes the motor drive apparatus mentioned in the first embodiment and the second embodiment, the current increase can be realized at a low cost.

In addition, since each phase has the plurality of pairs of switching elements, even when one of the switching elements is broken, the operation can be continued with the use of the other switching elements. In a case where the switching element is broken, the operation is continued by using a capability lower than the normal capability, and the operation such as giving an alarm to a user can be performed.

The configuration described in the above-mentioned embodiments indicates an example of the contents of the present invention. The configuration can be combined with another well-known technique, and a part of the configuration can be omitted or changed in a range not departing from the gist of the present invention.

The invention claimed is:

1. A motor drive apparatus to drive an electric motor, the motor drive apparatus comprising:
   inverter modules equivalent in number to phases of the electric motor; and
   a controller to generate a PWM signal for driving the inverter modules by using PWM, wherein
   each of the inverter modules includes:
   a plurality of pairs of switching elements, each pair of switching elements including two switching elements connected in series;
   a drive circuit to drive the plurality of pairs of switching elements in accordance with an input signal of the controller; and
   a protection circuit to stop the drive circuit when a predetermined threshold voltage value is exceeded regardless of the input signal from the controller,
   the plurality of pairs of switching elements is connected in parallel,
   a first terminal that is a reference terminal of the plurality of pairs of switching elements, a second terminal that is a reference terminal of the drive circuit, and an input terminal of the protection circuit are independently exposed to an outside, and
   the first terminal and the second terminal are connected to a single point on a printed circuit board by a wiring pattern.

2. The motor drive apparatus according to claim 1, comprising:
   a current detector connected to input or output of the plurality of inverter modules to detect a total current that flows through the plurality of inverter modules; and
   an overcurrent detecting circuit to which output of the current detector is connected, the overcurrent detecting circuit being configured to output a voltage that is equal to or greater than the predetermined threshold voltage value when the current that flows through the plurality of inverter modules exceeds a predetermined threshold current value, wherein
   a reference terminal of the current detector and a reference terminal of the overcurrent detecting circuit are electrically connected to the first terminal.

3. The motor drive apparatus according to claim 2, wherein
   impedances of wiring patterns between the respective first terminals of the plurality of inverter modules and the current detector are equal to one another.

4. The motor drive apparatus according to claim 1, wherein
   the plurality of inverter modules is oriented in a same direction and arranged such that a direction orthogonal to a longitudinal direction of a housing of each of the inverter modules coincides with an array direction of the modules.

5. The motor drive apparatus according to claim 1, wherein
   the plurality of inverter modules is oriented in a same direction and arranged such that a longitudinal direction of a housing of each of the inverter modules coincides with an array direction of the modules.

6. The motor drive apparatus according to claim 1, wherein
   the switching element includes a wide-bandgap semiconductor which is gallium nitride, silicon carbide, or diamond.

7. The motor drive apparatus according to claim 1, wherein
   the switching element is turned on or turned off at a speed of 200 A/us or more.

8. A refrigeration cycle apparatus, wherein
   the motor drive apparatus according to claim 1 is incorporated in a compressor, and the compressor includes a refrigeration cycle circuit in which a condenser, an expander, and an evaporator are coupled by a refrigerant pipe.

9. An air conditioner comprising the refrigeration cycle apparatus according to claim 8.

* * * * *